E. F. McCARTHY.
SHOCK ABSORBER FOR AUTOMOBILES.
APPLICATION FILED SEPT. 22, 1920.
1,434,017.
Patented Oct. 31, 1922.
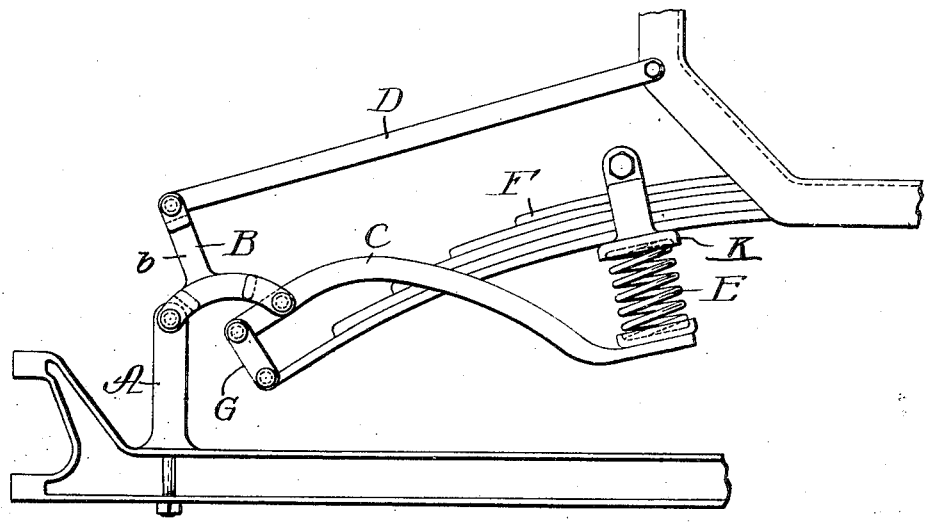
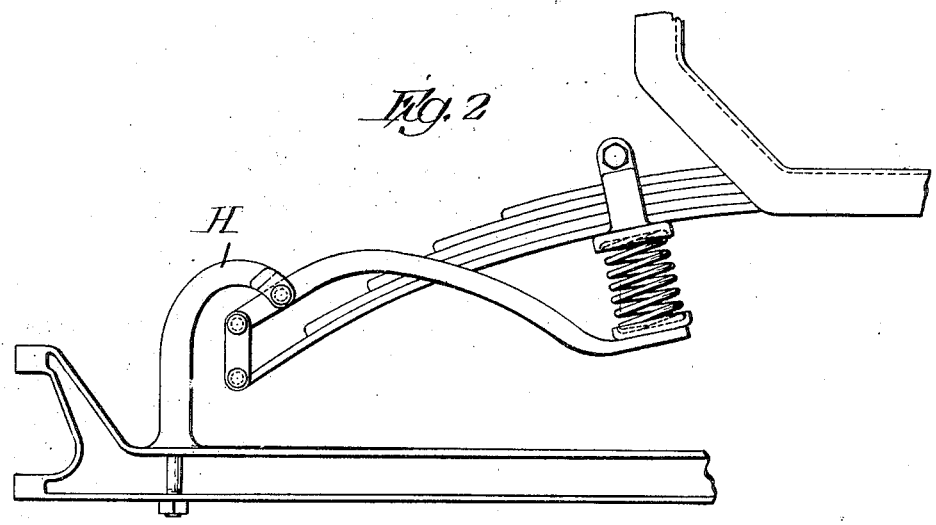
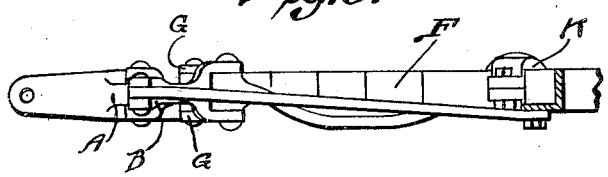
Inventor
Edward F. McCarthy Patented Oct. 31, 1922.

1,434,017

UNITED STATES PATENT OFFICE.

EDWARD F. McCARTHY, OF CHICAGO, ILLINOIS, ASSIGNOR TO THE RAMO MANUFACTURING COMPANY, OF CHICAGO, ILLINOIS, A CORPORATION OF ILLINOIS.

SHOCK ABSORBER FOR AUTOMOBILES.

Application filed September 22, 1920. Serial No. 411,959.

*To all whom it may concern:*

Be it known that I, EDWARD F. MCCARTHY, a citizen of the United States, residing at Chicago, in the county of Cook and State of Illinois, have invented new and useful Improvements in Shock Absorbers for Automobiles, of which the following is a specification.

This invention relates to shock absorbers for automobiles or other vehicles but more particularly to that type in which a coil or spiral spring is incorporated in the usual resilient support.

The primary object of the invention is to provide a shock absorbing device which is simple and durable in construction, efficient in action, and easily attached to a vehicle.

A further object of the invention is to provide a shock absorber construction which acts as a cushion or buffer to prevent breaking of the springs when a severe shock is experienced.

The many other objects and advantages of the invention will be better understood by reference to the following specification when considered in connection with the accompanying drawing illustrating a selected embodiment thereof, in which:—

Fig. 1 is an elevation of my improved shock absorber incorporated in a well-known make of automobile, Fig. 2 is an elevation of a modified form of my invention, and Fig. 3 is a plan view of the shock absorber shown in Fig. 1.

Referring to the drawing, a rigid support or perch A is attached to the axle of the wheel. A link or shackle B has its outer extremity pivotally connected to the upper end of the perch A and its inner extremity similarly connected to a lever C intermediate the ends of said lever. A rod or brace D is interposed between an upwardly projecting lug $b$ on the link or shackle B and the body of the vehicle. The inner and outer ends of this rod D are respectively pivotally connected to the lug $b$ and the vehicle body.

The outer portion of the lever C lies substantially above the outer extremity of the leaf spring F but the inner end portion is disposed below the spring and a coil or spiral spring E is interposed between this inner end portion and the leaf spring. The outer extremity of the lever is connected to the corresponding extremity of the leaf spring by a link or shackle G. A spring housing K is preferably attached to the leaf spring F to receive and engage the upper extremity of the spring E.

In the operation of my improved shock absorber, a downward thrust of the vehicle body causes the rod or link D to press the lug $b$ outwardly and to rock the link or shackle B about its outer pivotal connection. This rocking movement of the link or shackle B causes the outer extremity of the leaf spring to be lifted and thus prevents this spring from coming into contact with the axle. The shock that causes this downward thrust of the body is absorbed by the spring E as the downward thrust of the leaf spring causes the lever C to be rocked on its fulcrum, which is the pivotal connection of the lever with the link or shackle B. The outer end of the lever is depressed and the inner end is correspondingly raised. This upward movement of the inner end of the lever C is resisted by the spring E. When a shock of extraordinary violence is experienced, the spring E acts as a cushion or buffer between the axle and the vehicle body and thereby prevents the breaking of the leaf spring.

My improved shock absorbers not only perform their normal function of providing more comfortable riding conditions but they strengthen the leaf springs as the weight of the vehicle body is distributed between the end of the leaf spring and the point where the coil or spiral spring engages this spring.

In Fig. 2 of the drawing, I have illustrated a modification of my improved shock absorber in which the link or shackle B of the previous embodiment is omitted or practically incorporated as an integral part of the rigid support or perch H. The lever C is fulcrumed directly on the outer extremity of this support. The link or rod D is omitted.

I am aware that many other changes in the form and arrangement of the parts may be made without departing from the spirit of my invention and I reserve the right to make all such as fairly fall within the scope of the following claims.

I claim:

1. In a device of the class described, a rigid support, a shackle member pivotally attached to said support, a brace member connecting said shackle with the body of the vehicle, a lever pivotally attached intermediate its ends to said shackle member and having its outer end connected to the outer end of the vehicle spring, and a spiral spring interposed between the inner end portion of said lever and the underside of the vehicle spring.

2. In a device of the class described, a supporting member, a lever member fulcrumed intermediate its ends on said supporting member, the outer end of said lever member being connected to the outer end of the vehicle spring and the inner end of said lever member being disposed substantially beneath said vehicle spring, and a spiral spring interposed between the inner end portion of said lever member and said vehicle spring.

3. In a device of the class described, a supporting member, a lever fulcrumed intermediate its end portions on said supporting member and having one of said end portions linked to the end of the vehicle leaf spring, and a coil spring disposed between the opposite end portions of said lever and said vehicle spring.

4. In a device of the class described, a supporting member, a lever member fulcrumed intermediate its ends on said supporting member, a link connecting one end portion of said lever member with the outer extremity of the vehicle spring, and a spiral spring interposed between the opposite end portion of said lever member and the underside of the vehicle spring.

5. A vehicle comprising an axle, a rigid perch fixed to the axle, a shackle member having three extremities, one of said extremities pivotally attached to the rigid perch, another of said extremities being fulcrumed to a brace, said brace being deposed between the shackle member and the vehicle body, the third extremity of the shackle member being fulcrumed to a lever member, and means whereby the lever member supports the vehicle spring at two points, one of the points being the end of the vehicle spring and the other point being intermediate the end of the vehicle spring and the place on the vehicle where the vehicle spring is fastened, the last recited point being cushioned by having a spiral spring interposed between the base member and the under side of the vehicle spring.

EDWARD F. McCARTHY.